(12) United States Patent
Fort et al.

(10) Patent No.: US 11,085,395 B2
(45) Date of Patent: Aug. 10, 2021

(54) NACELLE SYSTEM AND METHODS OF OPERATION

(71) Applicant: AIRBUS OPERATIONS S.A.S., Toulouse (FR)

(72) Inventors: Frédéric Fort, Saint Genies Bellevue (FR); Alexandre Bellanger, Tournefeuille (FR); Laurent Jouathel, Leguevin (FR); Gary Benjamin Davison, Carrickfergus (GB); Richard Edward John Lockhart, Dollingstown (GB)

(73) Assignee: AIRBUS OPERATIONS S.A.S., Toulouse (FR)

( * ) Notice: Subject to any disclaimer, the term of this patent is extended or adjusted under 35 U.S.C. 154(b) by 362 days.

(21) Appl. No.: 16/189,131

(22) Filed: Nov. 13, 2018

(65) Prior Publication Data

US 2020/0025137 A1    Jan. 23, 2020

Related U.S. Application Data

(60) Provisional application No. 62/609,697, filed on Dec. 22, 2017.

(51) Int. Cl.
| | |
|---|---|
| *F02K 1/72* | (2006.01) |
| *B64D 29/02* | (2006.01) |
| *B64D 33/04* | (2006.01) |
| *F02K 1/70* | (2006.01) |
| *B64D 29/00* | (2006.01) |
| *B64D 29/08* | (2006.01) |

(52) U.S. Cl.
CPC ............... *F02K 1/72* (2013.01); *B64D 29/00* (2013.01); *B64D 29/02* (2013.01); *B64D 29/08* (2013.01); *B64D 33/04* (2013.01); *F02K 1/70* (2013.01); *F05D 2220/00* (2013.01)

(58) Field of Classification Search
CPC ... F02K 1/72; F02K 1/766; F02K 1/54; F02K 1/625; F02K 1/70; F02K 1/80; B64D 27/12; B64D 29/02; B64D 29/06; B64D 33/04

See application file for complete search history.

(56) References Cited

U.S. PATENT DOCUMENTS

| | | | |
|---|---|---|---|
| 8,727,275 B2 | 5/2014 | Aten et al. | |
| 8,931,736 B2 | 1/2015 | Aten et al. | |
| 9,228,532 B2 | 1/2016 | Aten et al. | |
| 9,334,831 B2 | 5/2016 | Gonidec et al. | |
| 9,784,216 B2 | 10/2017 | Aten et al. | |
| 2006/0145001 A1* | 7/2006 | Smith | B64D 33/04 244/110 B |

(Continued)

*Primary Examiner* — Andrew H Nguyen
(74) *Attorney, Agent, or Firm* — Buchanan Ingersoll & Rooney PC

(57) ABSTRACT

A nacelle for a jet engine having a selectively operated reverse thruster which redirects air flow to a cascade during a reverse thrust operation, the nacelle including a fancowl panel configured as a stationary partial cover for a jet engine; and a translating cowl panel configured to move transversely during a reverse thrust operation so as to expose a cascade for emitting reverse thrust airflow. In exemplary embodiments, a moveable automatic translating panel, or a rotatable hinge panel, or an extension portion of the fancowl is used to preserve clearance with an aircraft wing in a nacelle clearance area.

6 Claims, 8 Drawing Sheets

(56) References Cited

U.S. PATENT DOCUMENTS

| | | | |
|---|---|---|---|
| 2010/0287910 A1* | 11/2010 | Joret | B64D 29/06 |
| | | | 60/226.2 |
| 2012/0228403 A1* | 9/2012 | Caruel | F02K 1/766 |
| | | | 239/265.11 |
| 2014/0217195 A1* | 8/2014 | Aten | F02K 1/82 |
| | | | 239/1 |
| 2016/0169157 A1* | 6/2016 | Sawyers-Abbott | F02K 1/72 |
| | | | 239/1 |
| 2016/0245227 A1 | 8/2016 | Crawford et al. | |
| 2016/0273489 A1 | 9/2016 | Bunel et al. | |

\* cited by examiner

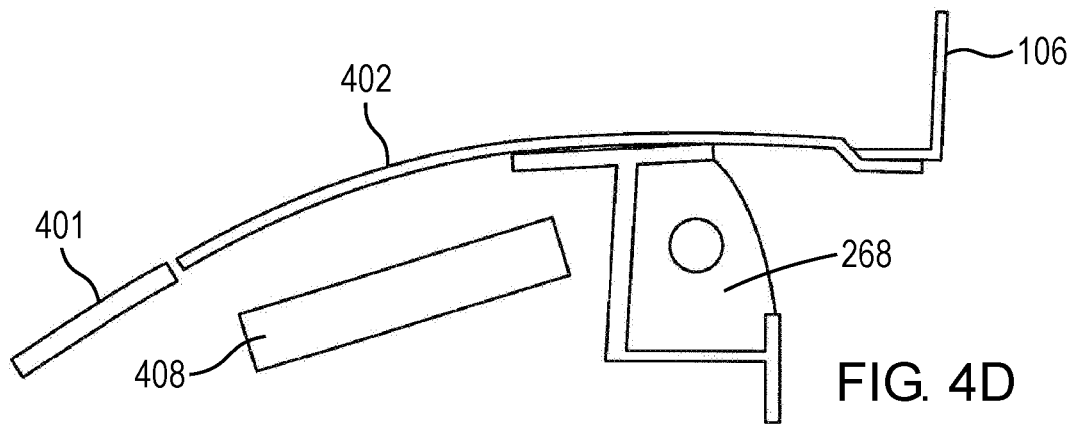
FIG. 4D
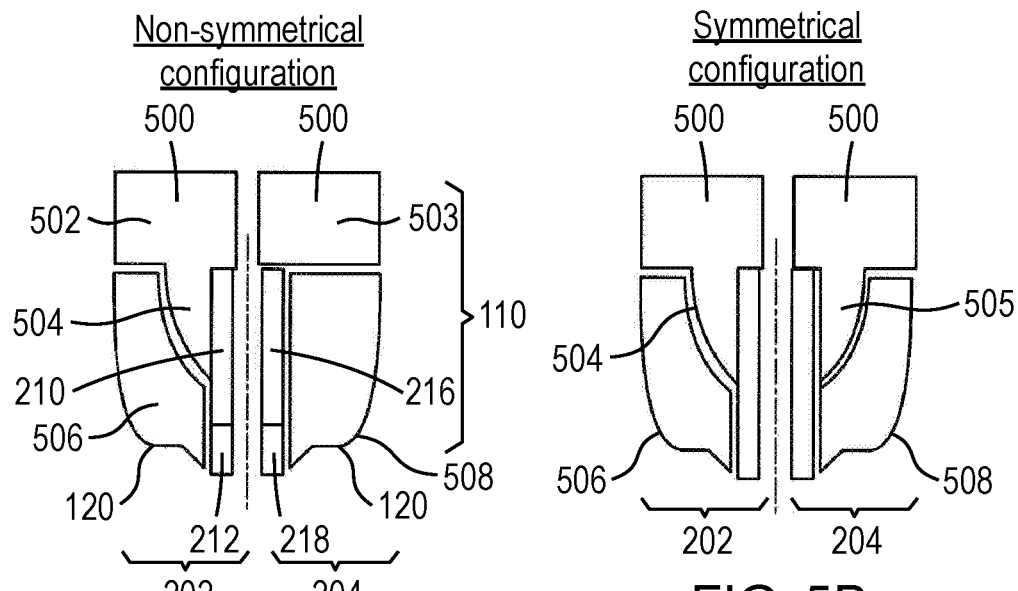
FIG. 5A
FIG. 5B
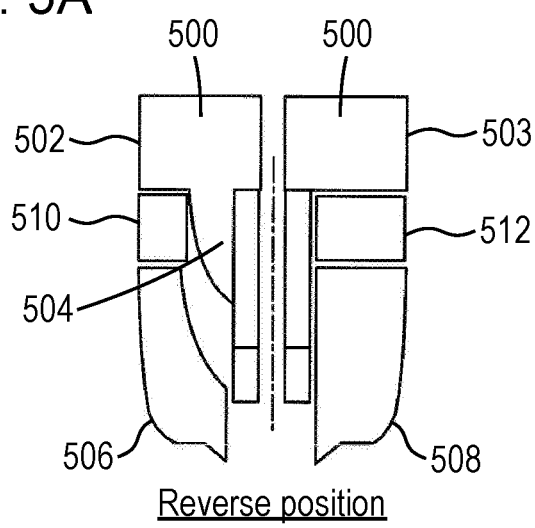
Reverse position
FIG. 5C

NACELLE SYSTEM AND METHODS OF OPERATION

RELATED APPLICATION

This application claims the benefit under 35 U.S.C. § 119 of U.S. Provisional Patent No. 62/609,697 filed on Dec. 22, 2017, the entire contents of which are hereby incorporated by reference in their entireties.

FIELD

Systems and methods are disclosed regarding jet aircraft engine nacelles, such as a nacelle for a jet engine having a reverse thruster.

BACKGROUND INFORMATION

Jet aircraft engines configured for under-wing mounting to an aircraft are known to include a nacelle encasing the engine. Then engine is connected via a pylon to the underside of the jet aircraft wing. One known aspect of engine placement beneath the wing is maintaining a clearance space between the nacelle which encases the jet engine and a leading edge slat of the wing. The leading edge slat can for example, be moveable between different positions to, for example, impact lift and drag of the aircraft. For example, the leading edge slat can be moved in a downward direction toward a jet engine located on the underside of the wing to create drag during a landing operation.

In addition to leading edge slat movement during a landing operation, the jet engine itself can be configured with a reverse thrust operation whereby exhaust air from the jet engine is redirected from an aft outlet portion of the engine, to a peripheral region of the jet engine via, for example, a cascade. A cascade can include plural vanes for redirecting airflow received via an inlet of the jet engine outward from a periphery of the jet engine to slow forward movement of the aircraft during landing.

One style of thrust reverser is a cascade reverser that incorporates radially arranged openings near the aft edge of the fan cowl of a turbofan engine. Within each of the one or more openings is mounted a cascade set of air flow turning vanes. A blocking door and its associated actuating system are positioned flush with the inner wall of the fan cowl adjacent to each opening. The outer surface of the cascade sets of vanes are covered by a "sleeve like" translating section of the cowl, so called the transcowl. When the thrust reversers are activated during an aircraft landing operation, an electro-mechanical actuating system causes the translating cowl to move aft thereby uncovering the cascades vanes. A linkage between the translating cowl and blocking doors moves the blocking doors into a bypass air stream to thereby block a normal path of the bypass airflow from the aft portion of the jet engine and divert it out through the cascades. The air flow turning vanes of the cascades can redirect the air flow in a forward direction of the aircraft to help slow the aircraft.

The translating cowl, or transcowl, should not contact, during aircraft operation, any portion of the wing to which the jet engine is relatively closely positioned. Indeed, a minimal clearance (e.g., few inches) between the wing's leading edge slat and the transcowl is desired to avoid any risk of contact.

More recently, jet engines have been developed with a high bypass ratio engine to, for example, increase the airflow bypass region for the bypass airflow which normally exits the aft portion of the jet engine. An increase in the airflow bypass region diameter involves increasing the diameters of the jet engine fan and of the nacelle that surround the engine and the fan. A larger diameter nacelle implies that a reduced proximity between the leading edge slat of the wing and the nacelle will result, or alternately an increase in height of the landing gear is required to maintain the prior clearance. As an optimal solution, the clearance tolerance between the wing's leading edge slat and the transcowl should be addressed particularly on the inboard side of the nacelle, closer to the aircraft fuselage, due to the dihedral of the wing.

A solution which focuses on a clearance tolerance of the nacelle should preserve the translational movement of the transcowl. Such movement allows the cascade to be covered during normal flight operation to preserve aerodynamic performance, yet uncovered during a landing operation via a movable drive actuator mechanism.

A known transversely moveable cowl, or sleeve, is disclosed in U.S. Pat. Nos. 8,727,275, 8,931,736, 9,228,532 and 9,784,216 which share a common specification. These patents disclose a nacelle configured to be coupled to an underside of a wing, and a fixed clearance space between an outlet cowling of the nacelle and a leading edge slat of the wing. To achieve this fixed clearance space, the outlet cowling includes a moveable portion configured as an outer translating sleeve, and includes another fixed portion located adjacent to the leading edge slat. This other fixed portion does not move when the reverse thrust configuration is activated so as to maintain the fixed clearance space of the nacelle from the leading edge slat. The '275 patent discloses that this fixed portion of the outlet cowling constitutes an outer fixed structure having a clearance distance to the leading edge slat when the leading edge slat is in a deployed configuration that remains substantially constant when the outer translating sleeve moves aft in the longitudinal direction, wherein the outer fixed structure includes a fixed panel extending at least partially circumferentially around an exterior surface of the cowling.

In some configurations (e.g., the 736 patent) the outlet cowling includes a first outer translating sleeve half configured to move aft in a longitudinal direction, and a second outer translating sleeve half configured to move aft in the longitudinal direction, wherein a bottom of a translating sleeve includes the first outer translating sleeve half and a top of the translating sleeve includes the second outer translating sleeve half. The outer fixed structure has a clearance distance to the leading edge slat which remains substantially constant in response to the leading edge slat being in the deployed configuration. A shape defined by the combination of the second outer translating sleeve half and the outer fixed structure is substantially symmetrical to the shape defined by the first outer translating sleeve half.

In some configurations (e.g., the '532 patent) the outer fixed structure occupies a gap between the outer translating sleeve and a pylon by which the jet engine is mounted to the wing, wherein the gap prevents interference between the outer translating sleeve and the leading edge slat upon movement of the outer translating sleeve. In other configurations (e.g., the '216 patent), the outlet cowling is separated from the inlet cowling by a transverse split line, the outlet cowling including: an outer translating sleeve configured to move aft in a longitudinal direction, and an outer fixed structure located aft of the transverse split line. The outer fixed structure is configured to be located between the outer translating sleeve and the wing to prevent interference between the outer translating sleeve and the leading edge slat upon movement of the outer translating sleeve.

U.S. Patent Publication No. 2016/0245227 discloses a nacelle wherein a translating sleeve has a slat cutout for clearance, and a slat door disposed at least partially in the slat cutout in response to the thrust reverser being in the stowed position. The slat door is configured to move in response to the thrust reverser being in the deployed position to expose a portion of the slat cutout to accept a portion of a deployed forward wing slat. The slat clearance door creates a generally continuous, smooth aerodynamic surface over the slat clearance door relative to the translating sleeve. The slat clearance door is coupled to the translating sleeve via a hinge, the hinge located along the aft edge of the slat clearance door.

U.S. Pat. No. 9,334,831 discloses a nacelle for an aircraft bypass turbofan engine which includes a downstream section having an outer structure with a cowling movably mounted on an inner fixed structure. One first panel is mounted on the inner structure on one side of the nacelle, and one second panel is mounted on the other side of the nacelle. The first panel is fixed and arranged to limit physical interference of the cowl with an element of the aircraft wing during thrust reversal, and at least one second panel is mounted on an opposite side of the top of the nacelle, the second panel being movable relative to the inner fixed structure and arranged to increase air discharged from the nacelle during thrust reversal.

U.S Patent Publication No. 2016/0273489 discloses a thrust reverser device wherein a thrust reverser half-cowl is mounted such that it can slide on a fixed support structure in a direction substantially parallel to a longitudinal axis of the device via a guidance assembly, between a direct-jet position and a reverse-thrust position. The fixed support structure includes a structure for offsetting the guidance assembly that guides the half-cowl circumferentially in a plane radial to the longitudinal axis between its various positions with respect to the half-beam on which the half-cowl is mounted. That is, the fixed support structure includes means adapted to circumferentially shift, in a plane radial to the longitudinal axis, the guiding assembly of the thrust reverser half-cowl between different positions relative to the longitudinal support half-beam on which the thrust reverser half-cowl is mounted.

All of the contents of the foregoing documents are hereby incorporated by reference in their entireties.

There is a need for a nacelle which optimizes aerodynamic performance of an aircraft to which it is attached, while observing tight clearance tolerances between moveable portions of the wing, such as the moveable leading edge slat, and moveable portions of the nacelle such as the translating cowl.

SUMMARY

A nacelle for a jet engine is disclosed, having a selectively operated reverse thruster which redirects air flow to a cascade during a reverse thrust operation, the nacelle comprising: a fancowl panel configured as a stationary partial cover for a jet engine; a translating cowl panel configured to move transversely during a reverse thrust operation so as to expose a cascade for emitting reverse thrust airflow; and an automatic translating panel (ATP) configured to be arranged in proximity to a leading edge slat of an aircraft wing to which the nacelle is to be mounted, and to move transversely in automated coordination with movement of the translating cowl panel during at least a portion of a movement range of the translating cowl panel, movement of the automatic translating panel being less than movement of the translating cowl panel so as to provide a variable clearance space between the automatic translating panel and the leading edge slat when the automatic translating panel transitions between stowed and deployed positions.

A nacelle for a jet engine is also disclosed having a selectively operated reverse thruster which redirects air flow to a cascade during a reverse thrust operation, the nacelle comprising: a fancowl panel configured as a stationary partial cover for a jet engine; a translating cowl panel configured to move transversely during a reverse thrust operation so as to expose a cascade for emitting reverse thrust air flow; and a hinged access panel with plural hinges configured for selective rotational movement of the hinged access panel to provide jet engine access, wherein the hinged access panel includes at least a first portion arranged on an inbound side of the jet engine and having a first shape, and a second hinged access panel portion arranged on an outbound side of the jet engine and having a second shape different from the first shape such that the hinged access panel possesses an asymmetric shape relative to a central longitudinal axis of the nacelle, the first hinged access panel portion on the inbound side being configured and located to provide a clearance of the nacelle to a leading edge slat of an aircraft wing to which the nacelle is to be mounted.

A nacelle for a jet engine is also disclosed having a selectively operated reverse thruster which redirects air flow to a cascade during a reverse thrust operation, the nacelle comprising: a fancowl panel configured as a stationary partial cover for jet engine; a translating cowl panel configured to move transversely during reserve thrust operation of the jet engine; a hinged access panel with plural hinges configured for selective rotational movement of the hinged access panel to provide jet engine access, wherein the hinged access panel includes at least a first portion arranged on an inbound side of the jet engine and having a first shape, and a second hinged access panel portion arranged on an outbound side of the jet engine, the first hinged access panel portion being of an irregular shape such that the first hinged access panel portion on the inbound side is configured and located to provide a clearance of the nacelle to a leading edge slat of an aircraft wing to which the nacelle is to be mounted.

A nacelle for a jet engine is also disclosed having a selectively operated reverse thruster which redirects air flow to a cascade during a reverse thrust operation, the nacelle comprising: a hinged access panel configured for selective movement to provide engine access; a translating cowl panel configured to move transversely during reverse thrust operation; and a fancowl panel configured as a stationary partial cover for a jet engine, wherein the fancowl panel includes at least a first fancowl portion, and a second fancowl portion which extends between the hinged access panel and the translating cowl panel on an inbound side of the jet engine to provide a clearance of the nacelle to a leading edge slat of an aircraft wing to which the nacelle is to be mounted.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIGS. 4A-4D show a third exemplary embodiment of the FIG. 1 "nacelle clearance area" which includes a moveable, irregularly shaped hinged access panel on at least an inbound side of the jet engine; and FIGS. 5A-5D show a fourth exemplary embodiment of the FIG. 1 "nacelle clearance area" which includes a fancowl in the inlet structure of the jet engine which includes a second fancowl portion that extends into the nacelle clearance area outlet structure.

DETAILED DESCRIPTION

Figure 1:
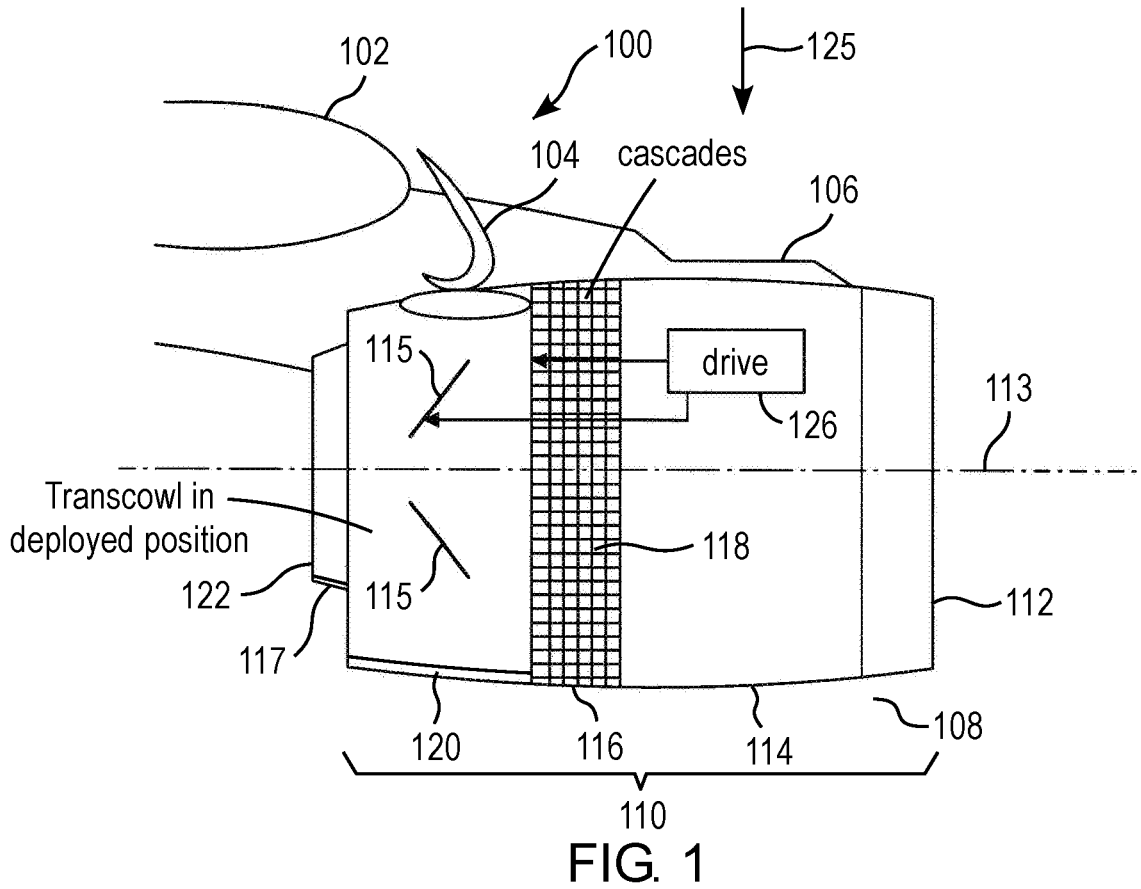
FIG. 1 shows an aircraft jet engine mounted on an aircraft, with a nacelle configured to have a "nacelle clearance area" as disclosed herein.

FIG. 1 shows an exemplary nacelle for a jet engine having a selectively operated reverse thruster which redirects a bypass air flow to a cascade during a reverse thrust operation.

The FIG. 1 embodiment shows an aircraft 100 having a wing structure illustrated in part as the leading edge slat 104 of a wing 102. The leading edge slat 104 is movable forward and downward, for example, during a landing operation so as to create drag to assist with a slowing down of the aircraft subsequent to touchdown.

The aircraft 100 includes a pylon 106 which extends from the wing 102 to support a jet engine 108. The jet engine 108 includes a shroud represented as nacelle 110 for encasing the engine and for enhancing aerodynamic performance of the aircraft 100.

A translating cowl panel, or transcowl, 120 of the nacelle 110 is configured to be transversely moveable during a landing operation so as to expose a cascade 116 for emitting reverse thrust airflow during a reverse thrust operation. The transcowl 120 is located behind an inlet side, stationary fan cowl panel 114 used to cover a turbofan of the jet engine 108, and is configured to move along the common longitudinal axis 113 of the jet engine and its nacelle toward an aft outlet side of the jet engine 108.

The cascade 116 includes a number of vanes configured as air fins 118 which direct bypass airflow from, for example, the inlet structure on an inlet side of the jet engine 108 outward from a periphery of the jet engine to assist with slowing of the aircraft 100 subsequent to landing.

During normal operation of the jet engine 108, air which is drawn into the jet engine via an inlet structure on the inlet side within the area of a nose lip 112 is exhausted from a bypass area 117 of an aft portion of the jet engine about an exhaust nozzle 122 located at an outlet of the jet engine. Subsequent to landing, the transcowl 120 is actively driven in an aft direction, for example, by a bidirectional electromechanical drive actuator 126 (e.g., bidirectional or unidirectional motor with transmission) along the longitudinal axis 113. A direct, or indirect, mechanical linkage causes blocking doors 115 to move into a position to block the bypass air flow about the periphery of the exhaust nozzle 122, and exposes the fins 118 of the cascade 116 to thereby cause bypass air of the jet engine to be expelled through the periphery of the jet engine in a forward direction to assist with braking.

Because the leading edge slat 104 of the wing 102 is moved forward and downward during a landing operation to create drag, and because the transcowl 120 is driven in an aft direction via the bi-directional drive actuator 126, a potential clash between the transcowl 120 and the leading edge slat 104 could occur. This clash could, for example, most likely occur on an inbound, or inward, side of the wing 102 closest to the main fuselage of the aircraft. Exemplary embodiments as disclosed herein therefore establish a novel nacelle clearance area 124. Exemplary embodiments as disclosed herein include various configurations to avoid a clash of the transcowl 120 with the leading edge slat 104 of the wing 102.

Automatic Translating Panel Embodiment

Figure 2A:
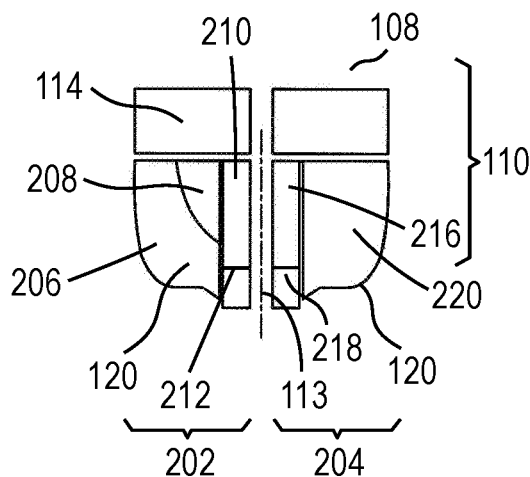
FIGS. 2A-2E show a first embodiment of the FIG. 1 "nacelle clearance area" which includes a moveable, automatic translating panel, which automatic translating panel can be mounted using any or all of three exemplary mounting configurations illustrated in FIGS. 2F, 2G and 2H.

Referring to FIG. 2A, a top view of the FIG. 1 jet engine 108 is shown from a direction of arrow 125, but with a "stowed" state of the transcowl 120 versus the "deployed" state of FIG. 1. In FIG. 2A, the nacelle 110 for the jet engine 108 having a selectively operated reverse thruster which redirects air flow to a cascade during a reverse thrust operation includes the fancowl panel 114 configured as a stationary partial cover for jet engine 108. A translating cowl panel 120 is configured to move transversely during a reverse thrust operation so as to expose cascade 118 for emitting reverse thrust airflow.

An automatic translating panel (ATP) 208 is configured to be arranged in the FIG. 1 nacelle clearance area 124, in proximity to the leading edge slat 104 of the aircraft wing 102 to which the nacelle is to be mounted (and to which the nacelle is mounted in the exemplary FIG. 1 embodiment), and to move transversely in automated coordination with movement of the translating cowl panel, or transcowl 120 during at least a portion of a movement range of the transcowl 120, movement of the automatic translating panel being less than movement of the translating cowl so as to preserve a variable clearance space between the automatic translating panel and the leading edge slat 104 when the automatic translating panel transitions between stowed and deployed positions. The nacelle clearance area 124 which contains the automatic translating panel 208 maintains a clearance at the interface of the nacelle 110 and the leading edge slat 104 during, for example, a landing operation.

As will be described, the automatic translating panel 208 can include at least one spring for biasing the automatic translating panel in compression to retain the automatic translating panel in the stowed position of FIG. 2A relative to the translating cowl panel, compression of the spring being released upon movement of the translating cowl panel during a reverse thrust operation to cause movement of the automatic translating panel.

FIG. 2A shows that the nacelle 110 can include a hinged access panel having portions 210 and 216, each having plural hinges configured for selective rotational movement of the hinged access panel to provide engine access.

The automatic translating panel 208 can include a radial contact for indicating when the automatic translating panel is in a stowed position, and/or when the automatic transition panel is in a deployed position of the jet engine during a reverse thrust operation.

FIG. 2A shows that portions 206 and 220 of the translating cowl panel 120 are configured for placement on opposing inbound 202 and outbound 204 sides of the jet engine, and are non-symmetrically shaped and arranged with regard to the central longitudinal axis 113 of the nacelle. Note that in FIG. 2A, a transverse plane which passes through the longitudinal axis 113 divides the jet engine 108 and its nacelle 110 into the inbound and outbound sides 202, 204.

In the FIG. 2A example, the top view illustrates a left hand side as the inbound side 202 of the nacelle, and a right hand side 204, or outbound side of the nacelle. In FIG. 2A, the inbound side 202 of the nacelle 110 is positioned closer to the fuselage of the aircraft 100, while the outbound side 204 of the nacelle is on a side of the nacelle 110 further from the aircraft fuselage. The inbound portion 206 of the transcowl 120 and the outbound portion 214 of the transcowl 120 thus collectively form the transcowl 120 shown in FIG. 1.

The FIG. 1 cascade 116 is completely encased in the stowed state of FIG. 2A. As already noted, the cascade 116 is provided for emitting airflow during a reverse thrust operation of the jet engine. In the FIG. 2A embodiment, the automatic translating panel 208 is positioned in the nacelle clearance area 124 of FIG. 1 on only the FIG. 2 inbound side 202 of the jet engine. As such, the cascade can have a first cascade portion with a first shape arranged on the inbound side of the jet engine, and a second cascade portion with a second shape arranged on an outbound side of the jet engine, the shapes of the first and second cascade portions providing an asymmetric cascade relative to a central longitudinal axis of the jet engine, with the first cascade portion arranged on the inbound side being smaller than the second cascade portion on the outbound side.

The nacelle 110 is shown in FIG. 2A includes the hinged access panel 210 which is configured for selective rotational movement to provide engine access. For example, the hinged access panel 210 on the inbound side 202 of the jet engine can be screwed in place or fixed by other known techniques, which allow for easy removal so that the jet engine can be accessed by rotating the hinged access panel during, for example, maintenance when the aircraft is not in operation. A second portion 216 of the hinged access panel can be located on the outbound side 204 of the jet engine. The hinged access panel can, for example, be attached at least in some portion with a hinged access that allows the hinged access panel portions to be moved rotationally upon removal of at least some screws so that the jet engine can be accessed.

The top view of FIG. 2A also illustrates a beam fairing 212 on the inbound side 202 of the jet engine which is included to cover portions of the jet engine not covered by the hinged access panel 210 on the inbound side for aerodynamic purposes. A similar beam fairing 218 can be included on the outbound side 204 to similarly provide closure over portions of the jet engine not already covered by other panels to enhance aerodynamic behavior of the aircraft engine.

Note that in the FIG. 2A embodiment, the automatic translating panel 208 only exists on the inbound side 202 of the jet engine 108 so as to address clearance issues with regard to the leading edge slat 104 of the aircraft wing 102 on the inbound side of the jet engine.

The automatic translating panel 208 is fastened to the jet engine in a manner which permits its movement. The automatic translating panel can be configured to include hinges attached thereto which slideably engage with stationary track guides for providing translational movement of the automatic translating panel along the guide tracks, and for retaining the automatic translating panel in place on the jet engine when the aircraft is in flight, as well as during movement of the automatic translating panel from a stowed position to a deployed position and vice versa.

Figure 2B:
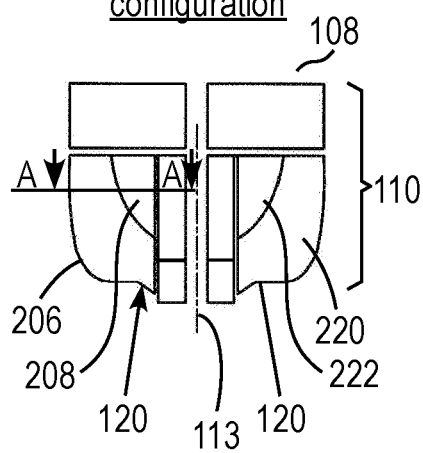

FIG. 2B shows an alternate embodiment of the automatic translating panel for a jet engine having a reverse thruster, wherein mirror image portions 208, 222 of the automatic translating panel are configured for placement on the opposing inbound and outbound sides 202, 204 of the jet engine, and are symmetrically arranged with regard to the central longitudinal axis 113 of the nacelle. Note that the transcowl 120 also includes mirror image portions 206, 220 in FIG. 2B.

Figure 2C:
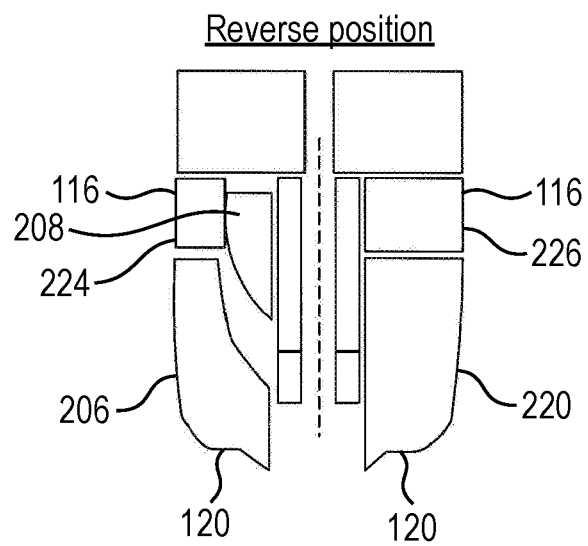

FIG. 2C shows the transcowl 120 portion and the automatic translating panel 208, of the FIG. 2A non-symmetrical configuration, in a deployed position to expose the asymmetrical cascades 116.

Note that the cascade 116 includes asymmetrical inbound cascades 224 and outbound cascades 226 in the exemplary embodiment.

Figure 2D:
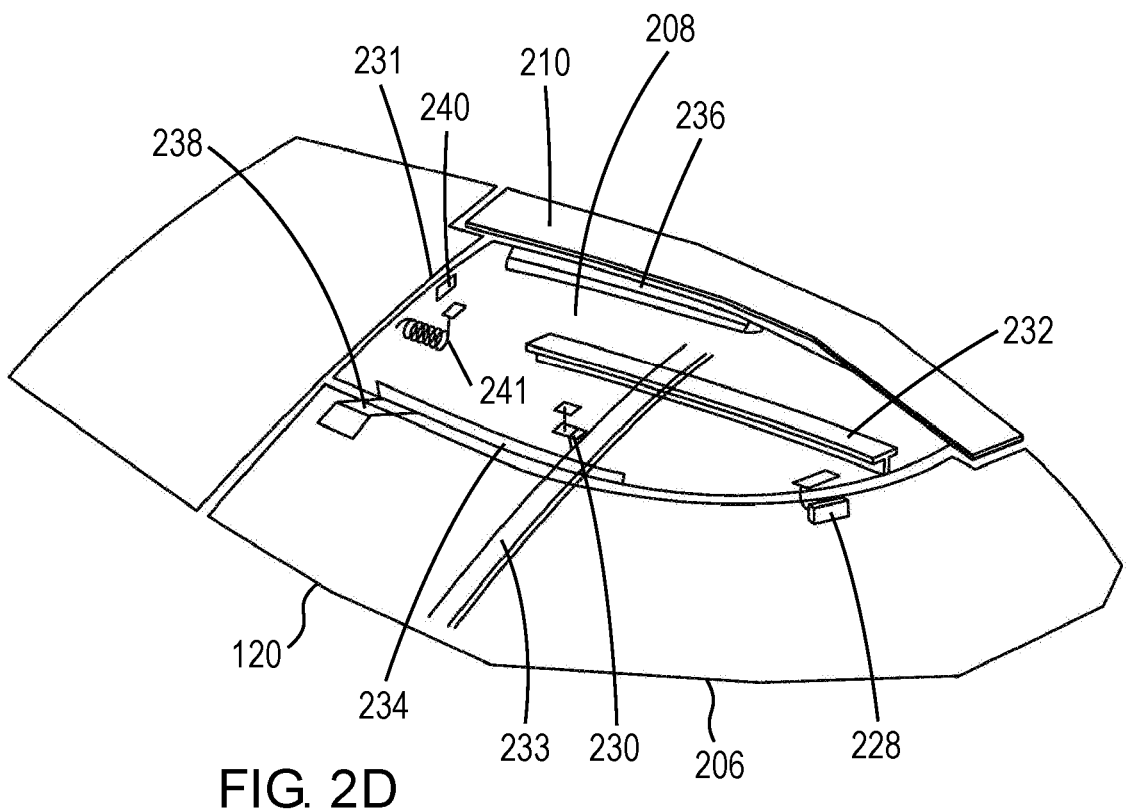
Figure 2E:
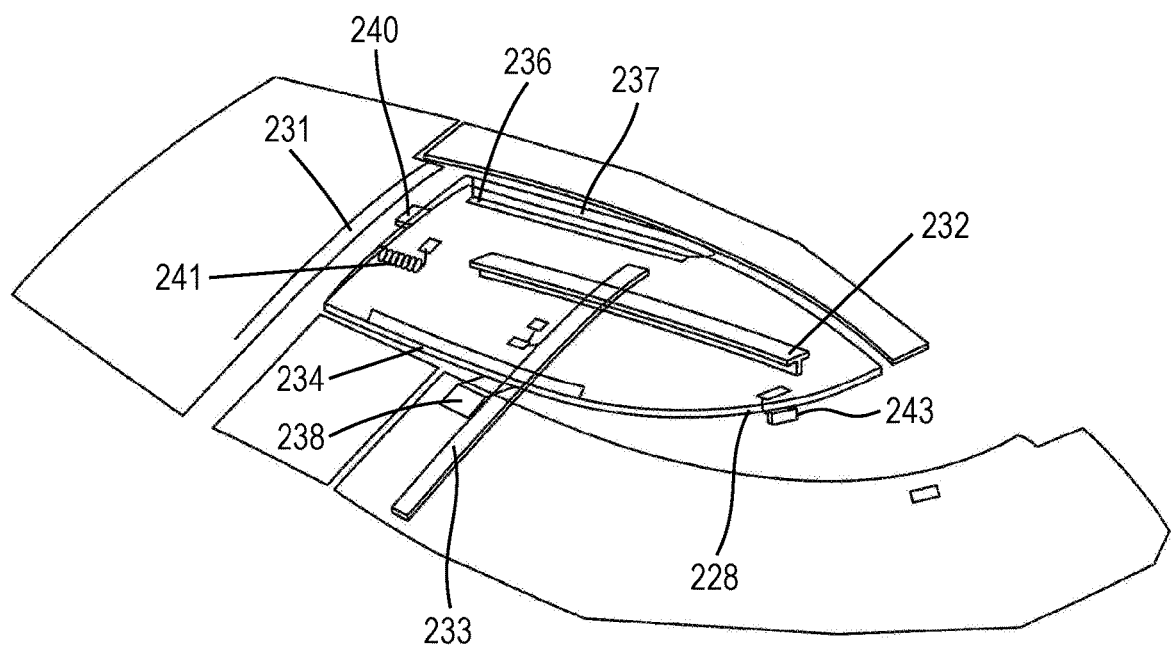

Referring to FIG. 2D, an exemplary stowed position of the automatic translating panel 208 is shown, while FIG. 2E shows an exemplary deployed position of the automatic translating panel 208. As already mentioned, hinges can be attached to the automatic translating panel for guiding its movement along tracks, such as secondary track 234 and tertiary track 236. Referring to FIG. 2D, actual hinges of the automatic translating panel are not specifically illustrated but will be described with respect to FIG. 2F and the first attachment configuration shown therein. FIG. 2D illustrates the basic stationary framework (e.g., forward frame 231 and aft frame 233) of the jet engine to which the automatic translating panel and transcowl panel are fit.

FIG. 2D shows a pushing device 228 by which the drive actuator 126 of FIG. 1 engages with the transcowl 120 to push it in an aft direction for deployment during a reverse thrust operation. The pushing device can of course be located in any suitable location. A panel contact 230 can be included at some position along the automatic translating panel 208 with contacts such that when the contacts are in proximity to one another, an indication (e.g., blinking light, or light on) can be provided to confirm the automatic translating panel to be in a stowed position. However, as will be seen in the illustration of FIG. 2E, when the automatic translating panel automatically deploys in response to motion of the transcowl 120, the relative proximity of the panel contacts 230 is displaced to provide an indication (e.g., steady light, or light off) to indicate that the automatic translating panel 208 has repositioned out of its stowed position and toward and/or into its deployed position.

An infrastructure of the jet engine can include a forward frame 231 and an aft frame 233 and various stationary tracks, such as a primary track 232. The secondary track 234, and tertiary track 236 can be fixably mounted to the stationary aircraft jet engine structure so that connection elements, such as one or more hinges or sliders 238, affixed to the various moving panels (i.e., the transcowl 120 and the automatic translating panel 208) can be used to guide the moveable panels into deployed positions.

In addition to the various hinges and sliders, snubbers such as snubber 240 can be included at and about a periphery of the automatic translating panel 208 and the transcowl 120 to retain the transcowl and the automatic translating panel in place during flight. Mechanical snubbers are known devices which can protect components from excess sway due to transient force. A snubber allows for movement in tension and compression, and upon occurrence of an impulse event can activate to become rigid and retain the otherwise movable panels in place.

FIG. 2E illustrates the deployed position of the FIG. 2D transcowl which has moved aftward. Note that the slider 238 has moved along the secondary track 234 in response to a pushing of the transcowl 120 in the aftward direction. Movement of the transcowl can be on the order of several feet.

Movement of the transcowl also releases a compression fitting (e.g., one or more coil springs 241 and/or compression clips 243 located at or near the pushing device, which compression clips release in response to movement of the transcowl 120 of the automatic translating panel so as to allow its movement along the guide tracks a limited distance (e.g., on the order of 10 millimeters). This movement is performed by a release of the compression springs used to otherwise maintain the automatic translating panel in place. The automatic translating panel can include one or more hinges or sliders 237 for guiding movement along the secondary and tertiary tracks 234, 236.

Figure 2F:
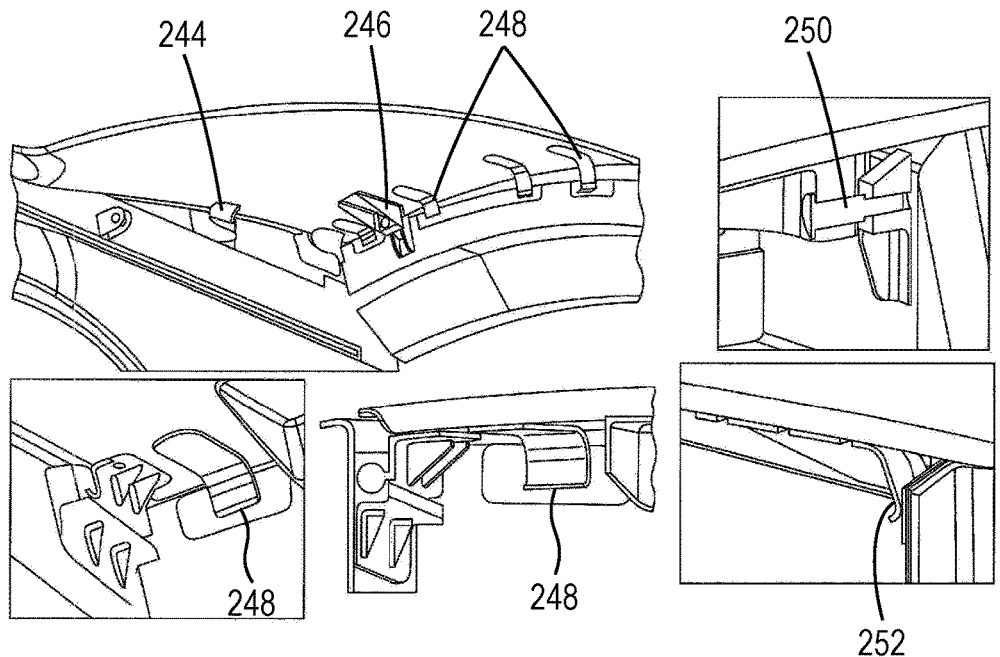
Figure 2G:
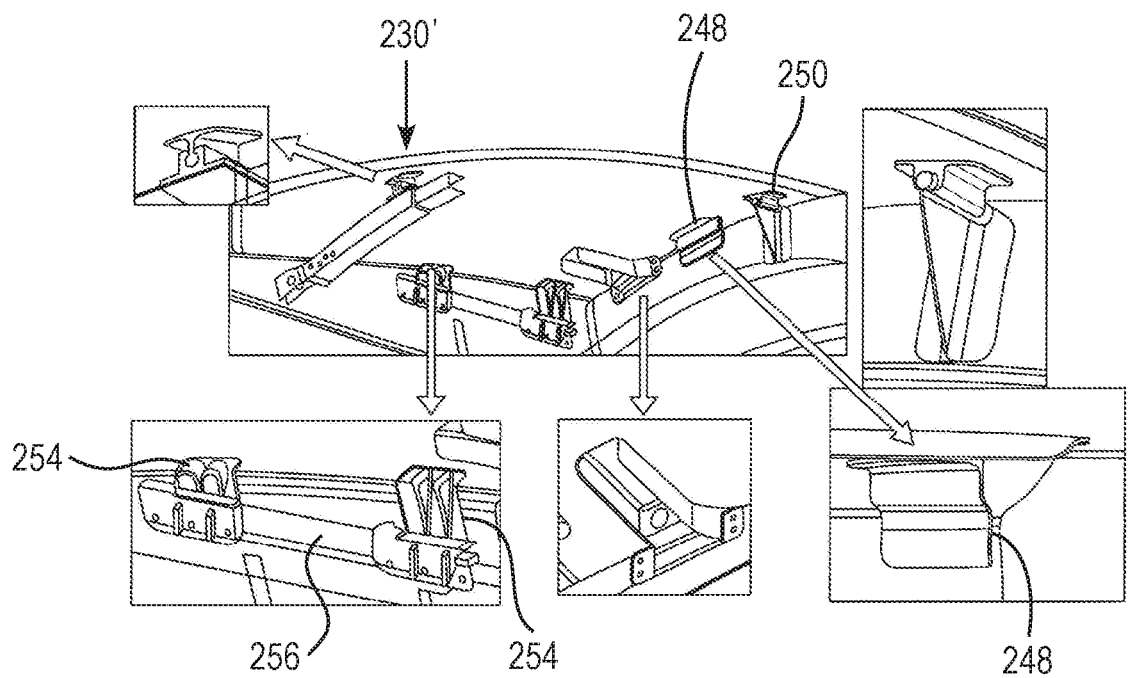
Figure 2H:
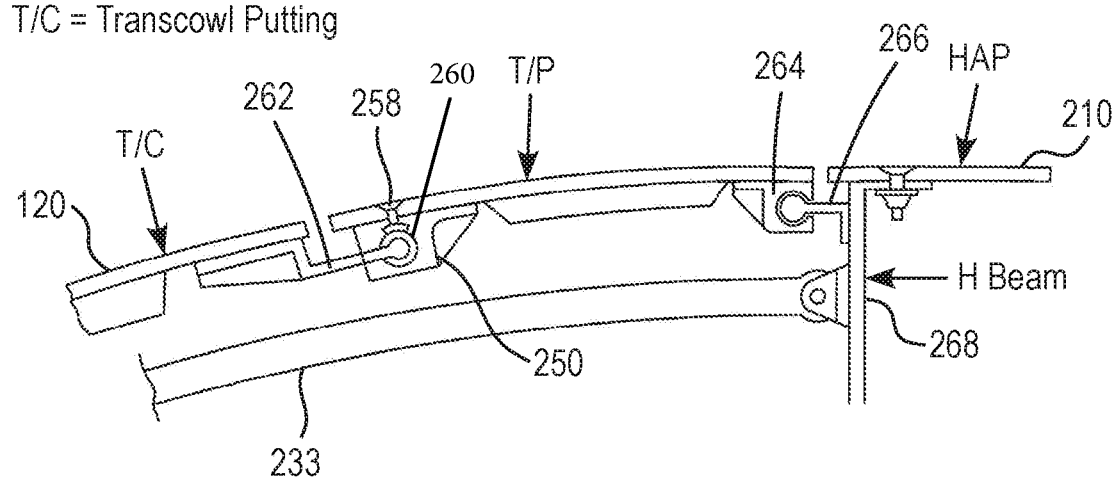

FIGS. 2F, 2G and 2H illustrate three different exemplary mechanisms for maintaining the automatic translating panel in place on the jet engine during flight and/or during guidance upon activation of a reverse thrust operation.

FIG. 2F shows automatic translating panel hinges 244 connected to the automatic translating panel for guiding movement of the automatic translating panel, and for retaining the automatic translating panel on the jet engine. Referring to FIG. 2F, the automatic translating panel includes one or more such hinges for guiding movement of the automatic translating panel and for retaining the automatic translating panel in place during its movement. The automatic translating panel needs to remain affixed to the jet engine while it translates, and upon decompression of the springs once the transcowl has moved in the aftward direction. Note that springs, such as springs 248 can be configured around a periphery of the automatic translating panel and can release upon movement of the transcowl so as to allow the automatic translating panel to move aftward. This movement can be controlled through the use of hinge devices such as the slider hinges 244 included on a periphery of the automatic translating panel, which engage with the stationary guide tracks located beneath the automatic translating panel. One or more snubbers 250 can also be located at positions around the automatic translating panel to assist with its retention in place during normal operation, and to release and allow motion of the automatic translating panel during a reverse thrust operation.

The springs, such as spring 252, or snubbers can also be positioned to act against a stop for limiting motion of the automatic translating panel and/or transcowl once in its deployed position.

FIG. 2G shows an alternate embodiment of a slider mechanism for retaining the automatic translating panel in place on the jet engine, yet allowing limited translation in an aftward direction.

As already mentioned, the nacelle can include at least one spring for biasing in the automatic translating panel in compression to retain a position of the automatic translating panel relative to the translating cowl panel, compression of the spring being released upon movement of the translating cowl to cause movement of the automatic translating panel in, for example, an aftward direction. Such springs can be included in not only the FIG. 2F embodiment but also the FIG. 2G embodiment.

Referring to FIG. 2G, a slider arrangement includes a slider fitting attached to the automatic translating panel for engaging with a stationary guide track attached to the jet engine for guiding movement of the automatic translated panel relative to the translating cowl panel. More particularly, as an alternative (or addition) to the hinge arrangement for connecting the automatic translating panel to the jet engine, sliders can be attached to the automatic translating panel. Sliders 254 engage with a guide track 256 along which the sliders translate upon release of the compression springs holding the automatic translating panel in place.

As already mentioned, a panel contact 230' on the panel can be used to indicate whether the panel is in its stowed position or its deployed position. In addition to the various springs and sliders, anti-scooping devices 246 can be used to assist the retention of the automatic translating panel in place and to assist with stopping movement of the automatic translating panel when it displaces to the extent of its support position.

In the FIG. 2G embodiment, the at least one slider fitting attached to the automatic translating panel engages with a stationary guide track attached to the jet engine for guiding movement of the automatic translating panel relative to the hinged access panel which remains stationary during movement of the automatic translating panel, and for guiding the automatic translating panel relative to the translating cowl. Note that portions of the translating cowl panel and the automatic translating panel configured for placement on opposing inbound and outbound sides of the jet engine can be non-symmetrically arranged with regard to the central longitudinal axis of the nacelle according to both the FIG. 2F and FIG. 2G embodiments. Alternately, portions of the translating cowl panel and automatic translating panel configured for placement on opposing inbound and outbound sides of the jet engine can be symmetrically arranged with regard to a central longitudinal axis of the nacelle as was described with respect to FIG. 2B.

FIG. 2H shows that a non-symmetrical or symmetrical arrangement of the automatic translating panel can be achieved with a third embodiment for retaining the automatic translating panel in place yet allowing its translational movement.

In FIG. 2H, an integrated slider fitting is integrally formed on an underside of the automatic transitioning panel for engaging with a stationary guide track of a jet engine frame of the jet engine; and an integrated slider fitting integrally is formed on an underside of the translating cowl panel such that the automatic transiting panel and the translating cowl panel will move along at least one common guide track during a reverse thrust operation.

In FIG. 2H an integrated slider fitting, such as slider fitting 258 is integrally formed on an underside of the automatic translating panel for engaging with a stationary guide track represented as a cylindrical guide channel 260. The fitting can be formed as a male connector which engages with the cylindrical channel 260. Similarly, the transcowl can include an integrated slider fitting 262 integrally formed on an underside of the translating cowl for engaging with the stationary guide represented as the same cylindrical guide channel 260.

Another guide channel 264 can be formed on the underside of the automatic translating panel to engage with a slider fitting attached to a stationary support frame 266 of the hinged access panel. The stationary support frame can be connected with the aft frame 233 which in turn is connected with the upper beam 268 of the jet engine mount.

Movable Hinged Access Panel Having Asymmetrical Shape

Figures 3A, 3B:
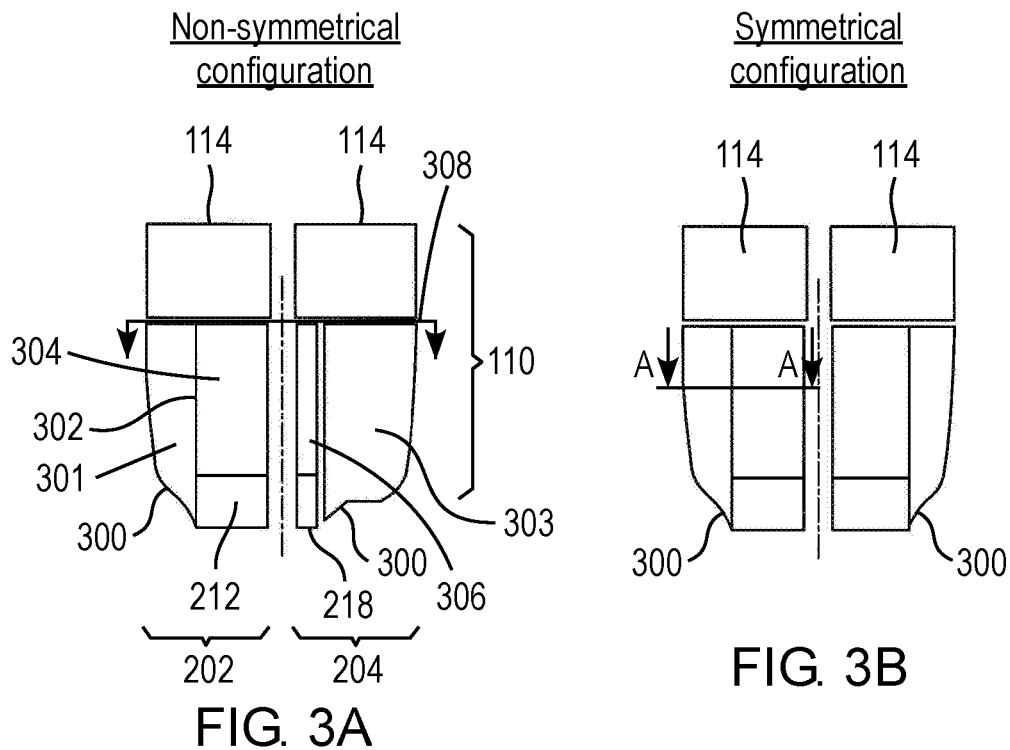
FIGS. 3A-3D show a second exemplary embodiment of the FIG. 1 "nacelle clearance area" which includes a moveable hinged access panel that is rotatable, the hinged access panel having asymmetrically configured first and second portions.

Referring to FIG. 3A, a top view of the FIG. 1 jet engine 108 is shown from the direction of arrow 125, but with a "stowed" state of the transcowl 120 versus the "deployed" state of FIG. 1. In FIG. 3A, the nacelle 110 for the jet engine 108 having a selectively operated reverse thruster which redirects air flow to a cascade during a reverse thrust operation includes the fancowl panel 114 configured as a stationary partial cover for jet engine 108. A translating cowl panel 300 having a first transcowl portion 301 and a second transcowl portion 303 is configured to move transversely during a reverse thrust operation so as to expose cascade 116 for emitting reverse thrust airflow.

In FIGS. 3A-3D, the alternate embodiment as shown of a nacelle for a jet engine 108 having a selectively operated reverse thruster which redirects air flow to a cascade during a reverse thrust operation, shows fancowl 114 panel configured as a stationary partial cover for a jet engine. The translating cowl panel 300 is configured to move transversely during a reverse thrust operation so as to expose a cascade 116 (FIG. 3C) for emitting reverse thrust air flow.

A hinged access panel 302 with plural hinges is configured for selective rotational movement of the hinged access panel to provide jet engine access, wherein the hinged access panel includes at least a first portion 304 arranged on an inbound side of the jet engine and having a first shape, and a second hinged access panel portion 306 arranged on an outbound side of the jet engine and having a second shape different from the first shape such that the hinged access panel possesses an asymmetric shape relative to a central longitudinal axis of the nacelle, the first hinged access panel portion on the inbound side being configured and located to provide a clearance of the nacelle to a leading edge slat of an aircraft wing to which the nacelle is to be mounted. Note that the transcowl first and second portions 301, 303 are shaped as a function of the hinged access panel portions 304, 306 (e.g., to complement the shapes of the hinged access panel portions).

Figure 3C:
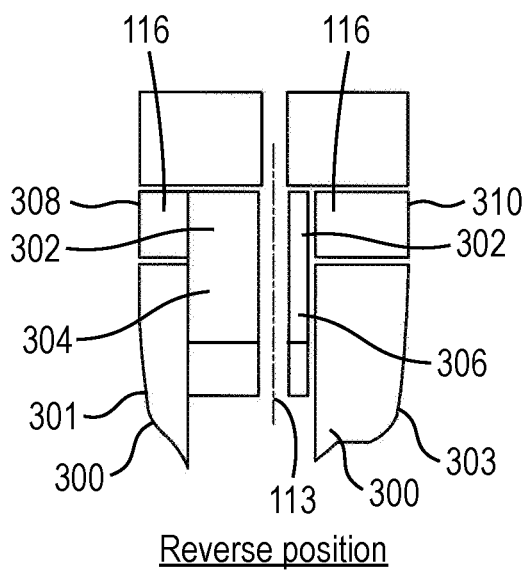

As shown in the deployed state of FIG. 3C, the cascade 116 for emitting airflow during a reverse thrust operation of the jet engine can include a first cascade 308 portion with a first shape arranged on an inbound side of the jet engine, and a second cascade portion 310 with a second shape arranged on an outbound side of the jet engine, the shapes of the first and second cascade portions providing an asymmetric cascade, with the first cascade portion arranged on the inbound side being smaller than the second cascade portion.

Figure 3D:
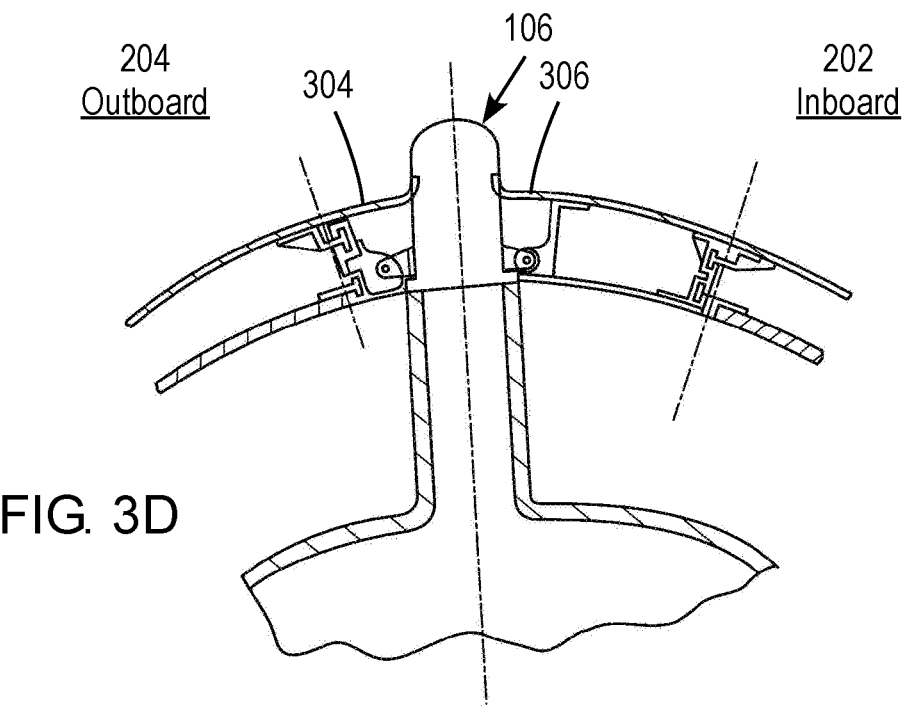

FIG. 3D shows a cross-section of the FIG. 3A jet engine about the pylon 106 from the direction of FIG. 3A arrow 308. The translating cowl panel(s) can be mounted and configured to move transversely in a manner as described with regard to FIGS. 2A-2H.

Moveable Hinged Access Panel Embodiment with Irregular Panel

Figures 4A, 4B:
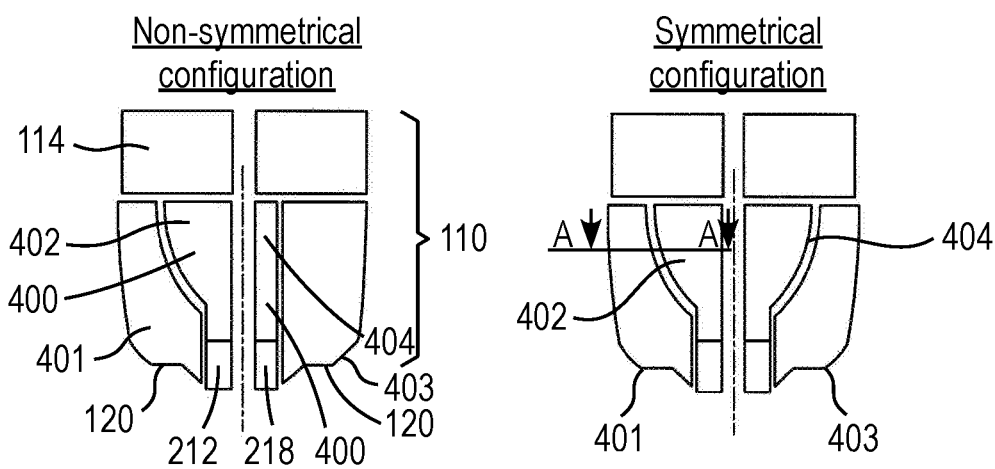

Referring to FIG. 4A, a top view of the FIG. 1 jet engine 108 is shown from a direction of arrow 125, but with a "stowed" state of the transcowl 120 versus the "deployed" state of FIG. 1. In FIG. 4A, the nacelle 110 for the jet engine 108 having a selectively operated reverse thruster which redirects air flow to a cascade during a reverse thrust operation includes the fancowl panel 114 configured as a stationary partial cover for jet engine 108. A translating cowl panel 120 having a first transcowl portion 401 and a second transcowl portion 403 is mounted and configured to move transversely during a reverse thrust operation so as to expose cascade 118 for emitting reverse thrust airflow in a manner as described with respect to FIGS. 2A-2H.

FIG. 3A shows the nacelle for a jet engine having a selectively operated reverse thruster which redirects air flow to a cascade during a reverse thrust operation includes the fancowl panel configured as a stationary partial cover for jet engine. The translating cowl panel is configured to move transversely during reserve thrust operation of the jet engine.

A hinged access panel 400 with plural hinges is configured for selective rotational movement of the hinged access panel to provide jet engine access, wherein the hinged access panel includes at least a first portion 402 arranged on an inbound side of the jet engine and having a first shape, and a second hinged access panel portion 404 arranged on an outbound side of the jet engine, the first hinged access panel portion being of an irregular shape such that the first hinged access panel portion on the inbound side is configured and located to provide a clearance of the nacelle to a leading edge slat of an aircraft wing to which the nacelle is to be mounted. Note that the transcowl first and second portions 401, 403 are shaped as a function of the hinged access panel portions 402, 404 (e.g., to complement the shapes of the hinged access panel portions).

The first hinged access panel portion 402 can be larger than the second hinged access panel portion 404 to create an asymmetric hinged access panel about a central longitudinal axis of the nacelle.

As shown in FIG. 4B, the first hinged access panel portion 402 and the second hinged access panel portion 404 can be irregularly-shaped mirror-images of one another to form a symmetrical configuration of the hinged access panel about a central longitudinal axis of the nacelle.

Figure 4C:
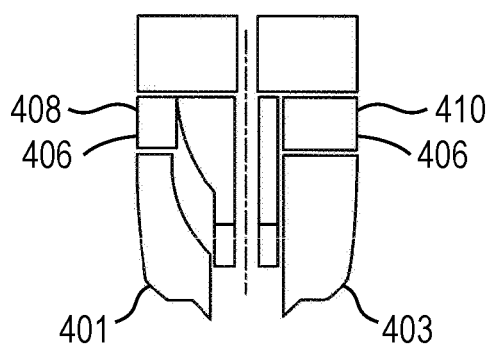

As shown in FIG. 4C, the jet engine can include a cascade 406 for emitting airflow during a reverse thrust operation of the jet engine, the cascade having a first cascade portion 408 with a first shape arranged on an inbound side of the jet engine, and having a second cascade portion 410 with a second shape arranged on an outbound side of the jet engine, the shapes of the first and second cascade portions providing an asymmetric cascade, with the first cascade portion arranged on the inbound side being smaller than the second cascade portion.

FIG. 4D shows a cross-section of the extended hinge access panel 402 of FIG. 4A in a stowed position, covering a blank portion of the cascade 408. In FIG. 4D, the cascades covered by the hinge access panel 402 can be considered "blank" cascades as they are in an area not exposed by the transcowl portion 401 when deployed.

Fancowl with Second Extended Portion

Referring to FIG. 5A, a top view of the FIG. 1 jet engine 108 is shown from a direction of arrow 125, but with a "stowed" state of the transcowl 120 versus the "deployed" state f FIG. 1. In FIG. 5A, the nacelle 110 for the jet engine 108 having a selectively operated reverse thruster which redirects air flow to a cascade during a reverse thrust operation includes the fancowl panel 500 configured as a stationary partial cover for jet engine 108. A translating cowl panel 120 is mounted and configured to move transversely during a reverse thrust operation so as to expose cascade 118 for emitting reverse thrust airflow.

A nacelle for a jet engine having a selectively operated reverse thruster which redirects air flow to a cascade during a reverse thrust operation, can include a hinged access panel with first and second portions 210, 216 configured for selective movement to provide engine access. A translating cowl panel 120 is configured to move transversely during reverse thrust operation.

A fancowl panel 520 is configured as a stationary partial cover for a jet engine, wherein the fancowl panel includes at least a first fancowl portion 502, and a second fancowl portion 504 which extends on the inbound side 202 between the hinged access panel (e.g., hinged access panel portion 210) and the translating cowl panel on an inbound side of the jet engine to provide a clearance of the nacelle to a leading edge slat of an aircraft wing to which the nacelle is to be mounted. The fancowl also includes an outboard fancowl portion 503. Note that the transcowl first and second portions 506, 508 are shaped as a function of the second fancowl portion 504, which is only located on the inbound side 202 of FIG. 5A.

In FIG. 5C, which corresponds to a deployed state of the FIG. 5A transcowl panels, the jet engine can include a cascade for emitting airflow during a reverse thrust operation of the jet engine, the cascade having a first cascade portion 510 with a first shape arranged on an inbound side of the jet engine, and a second cascade portion 512 with a second shape arranged on an outbound side of the jet engine, the shapes of the first and second cascade portions providing an asymmetric cascade, with the first cascade portion arranged on the inbound side being smaller than the second cascade portion.

In a FIG. 5B symmetrical embodiment, the fancowl includes the second fancowl portion 504 on the inbound side 202 and another second fancowl portion 505 on the outbound side of the nacelle. The first and second translating cowl panel portions 506, 508, which are shaped to complement the second fancowl portions 504, 505 respectively, can be irregularly-shaped mirror-images of one another to form a symmetrical configuration of the fancowl panels about a central longitudinal axis 113 of the nacelle.

Figure 5D:
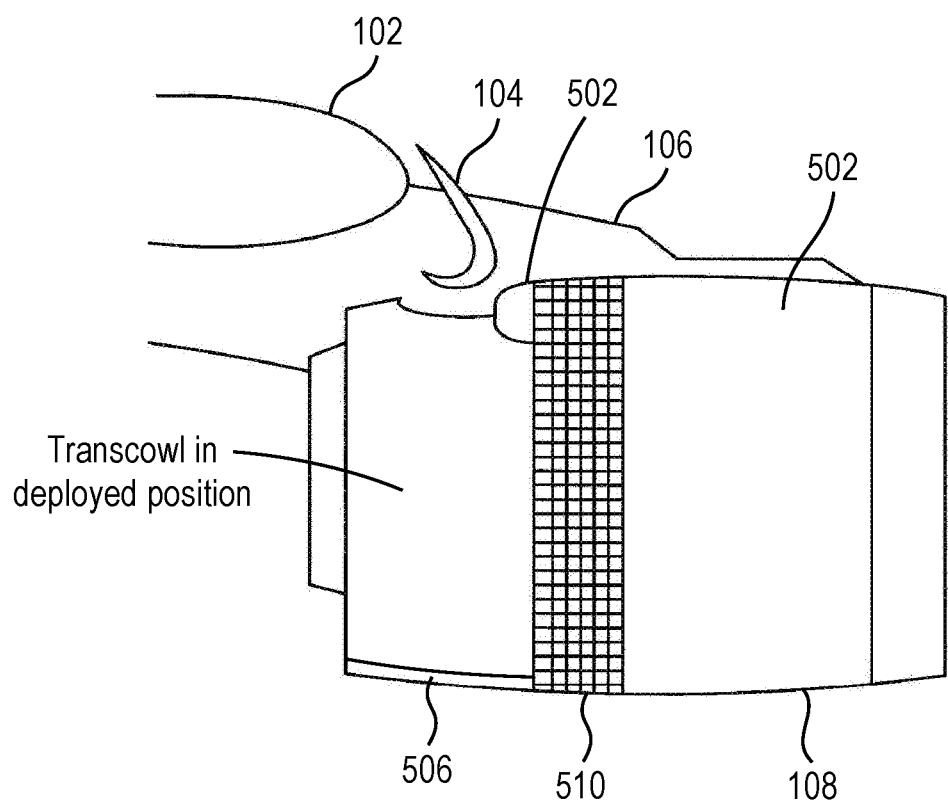

FIG. 5D shows the extended second fancowl portion 502 in profile during a deployed state of the transcowl panel 506.

Those skilled will appreciate that any or all features of the various embodiments can be combined with one another in whole or in part.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A nacelle for a jet engine having a selectively operated reverse thruster which redirects air flow to cascades during a reverse thrust operation, the nacelle having a central longitudinal axis and comprising:
    a fan cowl panel configured as a stationary partial jet engine cover for a jet engine;
    a translating cowl panel configured as a first movable partial jet engine cover to move during a reverse thrust operation along an axis parallel to the central longitudinal axis between a stowed state in which the translating cowl panel is closer to the fan cowl panel than in a deployed state in which the translating cowl panel has been moved away from the fan cowl panel so as to expose at least one of the cascades for emitting reverse thrust airflow; and
    an automatic translating panel (ATP) configured as a second moveable partial jet engine cover to be arranged in proximity to a leading edge slat of an aircraft wing to which the nacelle is to be mounted, the automatic translating panel being movable between a stowed state and a deployed state along an axis parallel to the central longitudinal axis, with a movement range of the automatic translating panel being less than a movement range of the translating cowl panel so as to provide a variable clearance space between the automatic translating panel and the leading edge slat when the automatic translating panel is transitioned between its stowed state and its deployed state;
    wherein portions of the translating cowl panel are configured for placement on opposing first and second sides of the jet engine, and are non-symmetrically arranged with regard to the central longitudinal axis of the nacelle; and
    wherein the jet engine includes a first cascade portion with a first shape arranged on the first side of the jet engine, and a second cascade portion with a second shape arranged on the second side of the jet engine, the first shape of the first cascade portion and the second shape of the second cascade portion being asymmetric relative to the central longitudinal axis, with the first cascade portion arranged on the first side being smaller than the second cascade portion arranged on the second side.

2. A nacelle as claimed in claim 1, wherein the automatic translating panel comprises:
    at least one compression spring for biasing the automatic translating panel in compression to retain the automatic translating panel in its a stowed state relative to the translating cowl panel with compression of the at least one spring being released upon movement of the translating cowl panel during the reverse thrust operation to cause movement of the automatic translating panel.

3. A nacelle as claimed in claim 2, wherein the automatic translating panel comprises:
    a radial contact for indicating when the automatic translating panel is in its stowed state and/or when the automatic translating panel is in its deployed state.

4. A nacelle as claimed in claim 3, comprising:
    a slider arrangement for guiding movement of the automatic translating panel, the slider arrangement including:
    stationary guide tracks extending along a direction parallel to the central longitudinal axis beneath the automatic translating panel, the automatic translating panel including connection elements for guiding movement of the automatic translating panel along the stationary guide tracks, the connection elements being arranged on a periphery of the automatic translating panel to engage with the stationary guide tracks.

5. The nacelle as claimed in claim 1, wherein the automatic translating panel is the only automatic translating panel.

6. An aircraft comprising the nacelle as claimed in claim 1, the aircraft comprising the aircraft wing with the leading edge slat, the automatic translating panel (ATP) being arranged in proximity to the leading edge slat of the aircraft wing to provide a variable clearance space between the automatic translating panel and the leading edge slat when the automatic translating panel is in its deployed state.

* * * * *